(12) United States Patent
Srivastava et al.

(10) Patent No.: US 10,572,692 B2
(45) Date of Patent: Feb. 25, 2020

(54) DETECTING CAMERA ACCESS BREACHES

(71) Applicant: HEWLETT PACKARD ENTERPRISE DEVELOPMENT LP, Houston, TX (US)

(72) Inventors: Animesh Srivastava, Palo Alto, CA (US); Puneet Jain, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 173 days.

(21) Appl. No.: 15/675,568

(22) Filed: Aug. 11, 2017

(65) Prior Publication Data

US 2019/0050606 A1 Feb. 14, 2019

(51) Int. Cl.
 *G06F 21/83* (2013.01)
 *G06F 21/55* (2013.01)
 *G06F 21/31* (2013.01)

(52) U.S. Cl.
 CPC ............ *G06F 21/83* (2013.01); *G06F 21/316* (2013.01); *G06F 21/554* (2013.01)

(58) Field of Classification Search
 CPC ....... G06F 21/83; G06F 21/554; G06F 21/316
 See application file for complete search history.

(56) References Cited

U.S. PATENT DOCUMENTS 9,027,145 B2 5/2015 Park et al.
9,088,601 B2 7/2015 Friedrichs et al.
2005/0108562 A1 5/2005 Khazan et al.
2012/0317565 A1* 12/2012 Carrara ..................... G06F 8/61
 717/178
2013/0097203 A1* 4/2013 Bhattacharjee ....... G06F 21/604
 707/783
2013/0263206 A1* 10/2013 Nefedov ............. G06F 21/6218
 726/1

(Continued)

OTHER PUBLICATIONS

Torregrosa, B.; "A Framework for Detection of Malicious Software in Android Handheld Systems Using Machine Learning Techniques"; 2015; 79 pages.

(Continued)

*Primary Examiner* — Nelson S. Giddins
(74) *Attorney, Agent, or Firm* — Hewlett Packard Enterprise Patent Department (57) ABSTRACT

Examples disclosed herein relate to detecting camera access breaches by an application running on a computing device. The examples enable determining, by a computing device comprising a physical processor that implements machine readable instructions, that a type of camera access of a camera on a computing device is requested by an application running on the computing device, wherein the type of camera access comprises a photo, a video, a facial recognition, a bar code scanning, or object detection; determining, by the computing device and based on a set of camera access types associated with the application, whether the requested type of camera access is permitted; and responsive to determining that the requested type of camera access is not permitted, remediating the unpermitted camera access request by causing display, by the computing device, of an alert on the computing device, where the alert comprises information about an improper access of the camera by the application.

20 Claims, 3 Drawing Sheets

```
510 DETERMINE WHETHER THE REQUESTED TYPE OF CAMERA ACCESS IS PERMITTED

511 DETERMINE WHETHER THE REQUESTED TYPE OF CAMERA ACCESS IS
  INCLUDED IN THE SET OF CAMERA ACCESS TYPES ASSOCIATED WITH THE
  APPLICATION

512 DETERMINE THAT A NUMBER OF CAMERA ACCESSES OF THE REQUESTED
  TYPE OF CAMERA ACCESS HAS EXCEEDED A FIRST PREDETERMINED
  THRESHOLD

513 DETERMINE THAT A NUMBER OF DISTINCT CAMERA ACCESS TYPES
  REQUESTED BY THE APPLICATION THAT ARE NOT INCLUDED IN THE SET OF
  CAMERA ACCESS TYPES HAS EXCEEDED A SECOND PREDETERMINED
  THRESHOLD
```

(56) References Cited

U.S. PATENT DOCUMENTS

| | | | | |
|---|---|---|---|---|
| 2014/0123325 | A1* | 5/2014 | Jung | G06F 21/6254 726/30 |
| 2014/0280934 | A1* | 9/2014 | Reagan | H04L 47/70 709/225 |
| 2015/0227746 | A1 | 8/2015 | Chen et al. | |
| 2015/0296371 | A1* | 10/2015 | Kong | H04W 8/18 455/419 |
| 2015/0358526 | A1* | 12/2015 | Cronin | H04N 5/23206 348/211.3 |
| 2017/0012981 | A1* | 1/2017 | Obaidi | H04L 63/102 |
| 2017/0149795 | A1* | 5/2017 | Day, II | H04L 63/101 |
| 2017/0300689 | A1* | 10/2017 | Phanse | G06F 21/56 |
| 2017/0329966 | A1* | 11/2017 | Koganti | G06F 21/554 |
| 2018/0183893 | A1* | 6/2018 | Mark | H04L 67/10 |

OTHER PUBLICATIONS

Zhou, Y. et al.; "Taming information-stealing Set Smartphone Applications (on Android)"; Apr. 13, 2011; 15 pages.

Aditya et al., "I-pic: A platform for privacy-compliant image capture", InProceedings of the 14th Annual International Conference on Mobile Systems, Applications, and Services (New York, NY, USA, 2016), MobiSys (vol. 16), 2016, 14 pages.

Afonso, V., et al., (2016), "Going Native: Using a LargeScale Analysis of Android Apps to Create a Practical Native-Code Sandboxing Policy", In Proceedings of the Annual Symposium on Network and Distributed System Security (NDSS).

APK Tool, "A tool for reverse engineering Android apk tiles", available online at <https://web.archive.org/web/20160329121531/https://ibotpeaches.github.io/Apktool/>, Mar. 29, 2016, 3 pages.

Aruba networks, "360° of analytics-driven active attack detection and response", available online at <http://www.arubanetworks.com/products/security/>, 4 pages.

Aruba Networks, "Meridian Mobile Apps", available online at <http://www.arubanetworks.com/products/mobile-engagement/app-platform/>, 3 pages.

Arzt et al., "FlowDroid: Precise Context, Flow, Field, Object-sensitive and Lifecycle-aware Taint Analysis for Android Apps", Jun. 9-11, 2014, 11 pages.

Chen et al., "Achieving Accuracy and Scalability Simultaneously in Detecting Application Clones on Android Markets", May 31-Jun. 7, 2014, 12 pages.

Crussell et al., "AnDarwin: Scalable Detection of Semantically Similar Android Applications", 2013, 18 pages.

Demetriou et al., "Free for All! Assessing User Data Exposure to Advertising Libraries on Android", Feb. 21-24, 2016, 15 pages.

Enck et al., "TaintDroid: an information-flow tracking system for realtime privacy monitoring on smartphones", ACM Transactions on Computer Systems (TOCS),vol. 32, Issue 2, Article No. 5, 2014, 15 pages.

Enev et al., "SensorSift: Balancing Sensor Data Privacy and Utility in Automated Face Understanding", Dec. 3-7, 2012, pp. 149-158.

Felt et al., "Android Permissions Demystified", Oct. 17-21, 2011, pp. 627-637.

Fuchs et al., "SCanDroid: Automated Security Certification of Android Applications", 2009, pp. 1-15.

Grace et al., "Unsafe Exposure Analysis of Mobile In-App Advertisements", Apr. 16-18, 2012, 12 pages.

HPE, "HPE Universal IoT Platform", available online at <http://h41111.www4.hpe.com/solutions/iot/>, 12 pages.

Jana et al., "A Scanner Darkly: Protecting User Privacy From Perceptual Applications", 2013, 15 pages.

Jana et al., "Enabling fine-grained permissions for augmented reality applications with recognizers", In ACM Proceedings of the 22nd USENIX conference on Security, 2014, pp. 415-430.

Klinkof et al., "Extending .NET Security to Unmanaged Code", 2007, 13 pages.

Liu et al., "Efficient Privilege De-Escalation for Ad Libraries in Mobile Apps", May 18-22, 2015, pp. 89-103.

Luk et al., "Pin: Building Customized Program Analysis Tools with Dynamic Instrumentation", Jun. 12-15, 2005, 11 pages.

Ma et al., "LibRadar: Fast and Accurate Detection of Third-party Libraries in Android Apps", May 14-22, 2016, 4 pages.

Mikolov et al., "Distributed Representations of Words and Phrases and their Compositionality", 2013, 9 pages.

Pandita et al., "WHYPER: Towards Automating Risk Assessment of Mobile Applications", 22nd USENIX Security Symposium, 2013, pp. 527-542.

Raval et al., "What you mark is what apps see", In ACM International Conference on Mobile Systems, Applications, and Services (Mobisys), 2014, 13 pages.

Roesner et al., "World-driven access control for continuous sensing", In Proceedings of the 2014 ACM SIGSAC Conference on Computer and Communications Security, Nov. 2014, pp. 1169-1181.

Siefers et al., "Robusta: Taming the Native Beast of the JVM", Oct. 4-8, 2010, 11 pages.

Smartphone OS Market Share, available online at <https://web.archive.org/web/20161224094203/https://www.idc.com/promo/smartphone-market-share/os>, Dec. 24, 2016, 3 pages.

Sun et al., "NativeGuard: Protecting android applications from third-party native libraries", In Proceedings of the 2014 ACM conference on Security and privacy in wireless & mobile networks, Jul. 2014, pp. 165-176.

Viennot et al., "A Measurement Study of Google Play", Jun. 16-20, 2014, 13 pages.

Wahbe et al., "Efficient Software-Based Fault Isolation", SIGOPS, 1993, pp. 203-216.

Wang et al., "WuKong: A Scalable and Accurate Two-Phase Approach to Android App Clone Detection", Jul. 12-17, 2015, pp. 71-82.

Wijesekera et al., "Android Permissions Remystified: A Field Study on Contextual Integrity", 24th USENIX Security Symposium, 2015, pp. 499-514.

Yoon Kim, "Convolutional Neural Networks for Sentence Classification", Oct. 25-29, 2014, pp. 1746-1751.

Yuan et al., "Droid-Sec: Deep Learning in Android Malware Detection", SIGCOMM'14, Aug. 17-22, 2014, pp. 371-372.

Zhou et al., "Hey, You, Get Off of My Market: Detecting Malicious Apps in Official and Alternative Android Markets", Published in NDSS 2012, 13 pages.

* cited by examiner

```
500 DETERMINE THAT A TYPE OF CAMERA ACCESS OF A CAMERA ON A COMPUTING
DEVICE IS REQUESTED BY AN APPLICATION RUNNING ON THE COMPUTING DEVICE
```
↓
```
510 DETERMINE, BASED ON A SET OF CAMERA ACCESS TYPES ASSOCIATED WITH THE
APPLICATION, WHETHER THE REQUESTED TYPE OF CAMERA ACCESS IS PERMITTED
```
↓
```
520 RESPONSIVE TO DETERMINING THAT THE REQUESTED TYPE OF CAMERA ACCESS
IS NOT PERMITTED, REMEDIATE THE UNPERMITTED CAMERA ACCESS REQUEST BY
CAUSING DISPLAY OF AN ALERT ON THE COMPUTING DEVICE, WHERE THE ALERT
COMPRISES INFORMATION ABOUT AN IMPROPER ACCESS OF THE CAMERA BY THE
APPLICATION
```

FIG. 6

```
510 DETERMINE WHETHER THE REQUESTED TYPE OF CAMERA ACCESS IS PERMITTED

511 DETERMINE WHETHER THE REQUESTED TYPE OF CAMERA ACCESS IS
    INCLUDED IN THE SET OF CAMERA ACCESS TYPES ASSOCIATED WITH THE
    APPLICATION

512 DETERMINE THAT A NUMBER OF CAMERA ACCESSES OF THE REQUESTED
    TYPE OF CAMERA ACCESS HAS EXCEEDED A FIRST PREDETERMINED
    THRESHOLD

513 DETERMINE THAT A NUMBER OF DISTINCT CAMERA ACCESS TYPES
    REQUESTED BY THE APPLICATION THAT ARE NOT INCLUDED IN THE SET OF
    CAMERA ACCESS TYPES HAS EXCEEDED A SECOND PREDETERMINED
    THRESHOLD
```

DETECTING CAMERA ACCESS BREACHES

BACKGROUND

An increasing amount of third party applications are available for download and use on computing devices. These applications access resources of the computing device, like the camera of the device. Once given access to a camera of a computing device, an application may have an unrestricted ability to perform any type of camera access (e.g., take a picture, shoot a video, scan a bar code, perform facial recognition, perform object recognition, etc.). An end-user of the computing device that is running the application may not have knowledge of the amount and types of camera accesses of the applications running on the computing device.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for detecting camera access breaches. The disclosed examples may include systems, devices, computer-readable storage media, and methods for detecting camera access breaches. For purposes of explanation, certain examples are described with reference to the components illustrated in FIGS. 1-6. The functionality of the illustrated components may overlap, however, and may be present in a fewer or greater number of elements and components.

Figure 5:
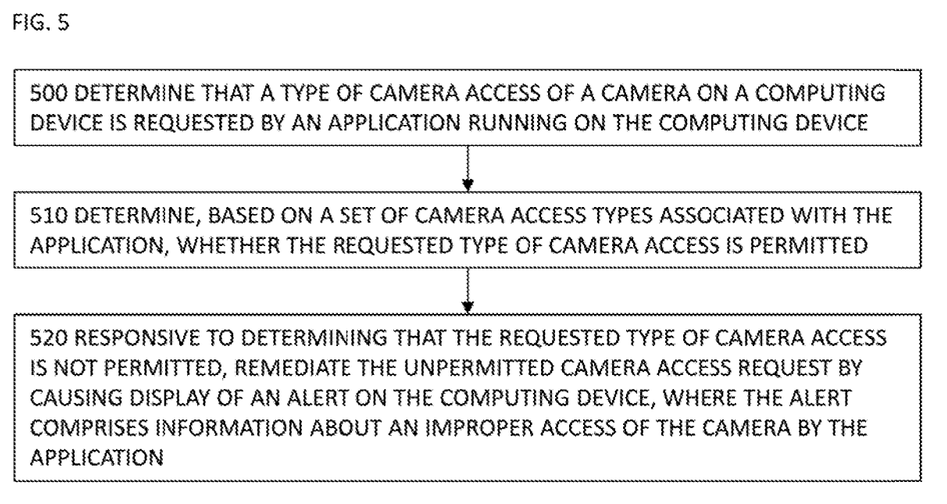
FIG. 5 is a flow diagram depicting an example method for camera access breach detection.
Figure 6:
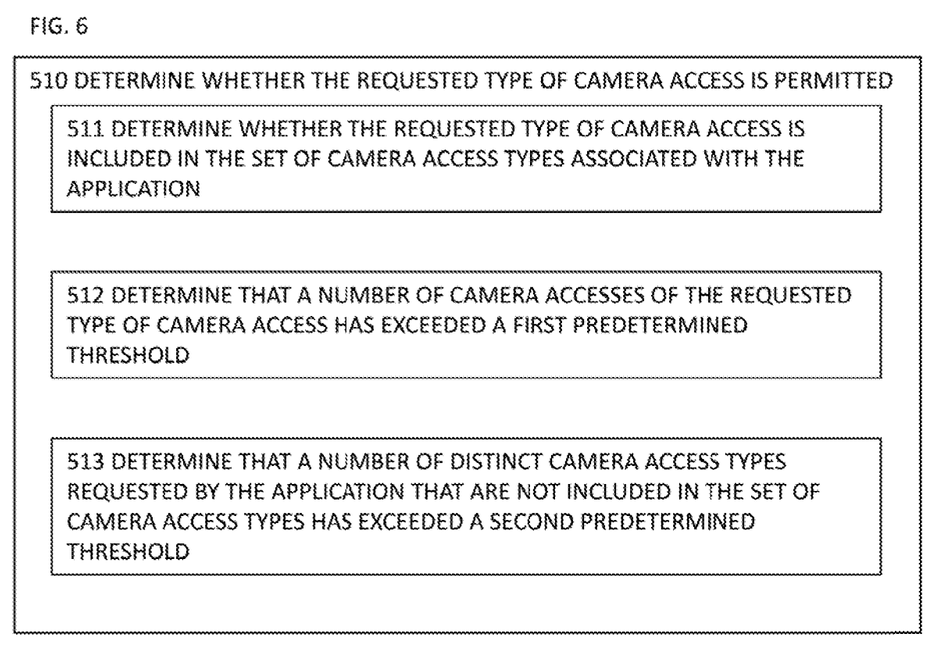
FIG. 6 is a flow diagram depicting an example method for camera access breach detection.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

An increasing amount of third party applications are available for download and use on computing devices. These applications access resources of the computing device, like the camera of the device. Once given access to a camera of a computing device, an application may have an unrestricted ability to perform any type of camera access (e.g., take a picture, shoot a video, scan a bar code, perform facial recognition, perform object recognition, etc.). An end-user of the computing device that is running the application may not have knowledge of the amount and types of camera accesses of the applications running on the computing device.

A technical solution to this technical challenges would detect camera access breaches by an application and provide remediation for those camera access breaches. In particular, a technical solution to these technical challenges would determine that a type of camera access of a camera on a computing device is requested by an application running on the computing device. In some examples, the technical solution may determine, based on a set of camera access types associated with the application, whether the requested type of camera access is permitted. The set of camera access types associated with the application may be determined based on a description associated with the application.

Responsive to determining that set of camera access types associated with the application includes the camera access type, the camera access request may be permitted. Responsive to determining that the requested type of camera access is not permitted, the technical solution may then cause display of an alert on the computing device, where the alert comprises information about an improper access of the camera by the application. In some examples, responsive to determining that the requested type of camera access is not permitted, the application may be prevented from accessing the camera of the computing device, or even from accessing a local area network to which the computing device had been connected. In some examples, determining that the requested type of camera access is not permitted may comprise a determination that the requested type of camera access is not included in the set of camera access types associated with the application. In some examples, determining that the requested type of camera access is not permitted may comprise determining that a number of camera accesses of the requested type of camera access has exceeded a first predetermined threshold or determining that a number of distinct camera access types requested by the application and not included in the set of camera access types associated with the application has exceeded a second predetermined threshold.

In some examples, information may be logged about each request of a camera access request by the application, where the information may include the type of the camera access requested, a geolocation of the computing device when the request was received, and an indication of whether the request was permitted. In some examples, reports may be provided that include information about the camera accesses requested by each application running on the computing device, where the report includes, for each application, a list of camera access types requested and a corresponding indicator of an amount of camera access requests of each type of camera access type requested.

Examples discussed herein address these technical challenges by providing a technical solution that detects camera access breaches and provides remediation for the detected breaches. For example, the technical solution may detect camera access breaches by determining, at a computing device comprising a physical processor that implements machine readable instructions, that a type of camera access of a camera on the computing device is requested by an application running on the computing device, wherein the type of camera access comprises a photo, a video, a facial recognition, a bar code scanning, or object detection. The computing device may then determine, based on a set of camera access types associated with the application, whether the requested type of camera access is permitted. Responsive to determining that the requested type of camera access is not permitted, the computing device may remediate the unpermitted camera access request by causing display of an alert on the computing device, where the alert may include information about an improper access of the camera by the application.

Figure 1:
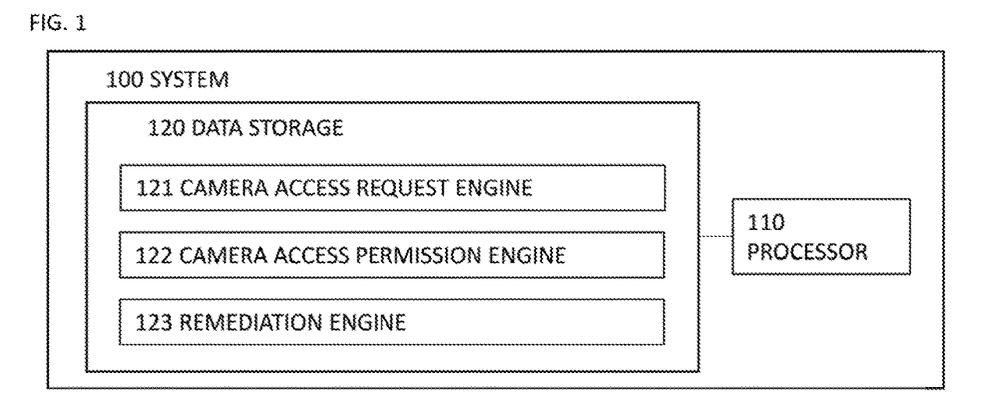
FIG. 1 is a block diagram depicting an example environment in which various examples may be implemented as a camera access breach detection system.

FIG. 1 is an example environment 100 in which various examples may be implemented as a camera access breach detection system 100. In some examples, camera access breach detection system 100 may comprise a computing device, such as a laptop computing device, mobile phone, desktop computing device, an all-in-one computing device, a tablet computing device, an electronic book reader, a smart television, an IoT device, and/or any electronic device that has a camera communicably coupled to the device and that can run applications.

According to various implementations, camera access breach detection system 100 and the various components described herein may be implemented in hardware and/or a combination of hardware and programming that configures hardware. Furthermore, in FIG. 1 and other Figures described herein, different numbers of components or entities than depicted may be used.

Camera access breach detection system 100 may comprise a processor 110, a camera access request engine 121, a camera access permission engine 122, a remediation engine 123, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

Camera access request engine 121 may determine that a type of camera access of a camera on a computing device is requested by an application running on the computing device. A request to access the camera on the computing device may comprise, for example, a request to capture media using the camera (e.g., a photo, video, audio, and/or other media, a request to use camera data to perform functionality (e.g., audio decoding, video decoding, object recognition, face recognition, 3D rendering, bar code scanning, QR code scanning, edge detection, text rendering, and/or other functionality that uses camera data), and/or other request to manipulate information or functionality available from the camera of the computing device.

In some examples, camera access request engine 121 may determine, for each request to access the camera of the computing device, a type of the camera access, a source of the camera access (e.g., an application running on the camera access, an operating system of the computing device, and externally connected device communicably coupled to the computing device, and/or other source), and/or other information related to the request for access to the camera.

The camera access request engine 121 may determine the type of camera access by detecting function calls made by applications running on the computing device. The camera access request engine 121 may determine whether the detected function call (or sequence of function calls) relates to a request to access the camera. The camera access request engine 121 may also determine a type of the request to access the camera based on the detected function (or sequence of function calls). The camera access request engine 121 may determine the source of the request and/or other information related to the request from the request itself.

In some examples, the camera access request engine 121 may use dynamic binary instrumentation techniques to detect function calls in real time. The camera access request engine 121 may determine the type of the request from the detected function call(s) and/or from APIs or libraries accessed via the detected function call(s). In some of these examples, the function call(s) may have been instrumented to include information indicating that the function call(s) relate to a camera access request and/or relate to a type of camera access request.

In some examples, the camera access request engine 121 may log information about each camera access request. For example, the camera access request engine 121 may log, for each camera access request, information including a source of the request, a type of the camera access requested, a response to the request (e.g., if the request is permitted or not permitted), information about remediation in response to a non-permitted request, and/or other information about the camera access request. In some examples, the information logged may also include a timestamp of the request, a geolocation of the computing device when the request was received, and/or other metadata related to the request.

In some examples, the camera access request engine 121 may provide a report related to camera access requests. The camera access request engine 121 may provide a report detailing information for camera requests for a computing device, for a set of computing devices connected via a network, for a specific application (or set of applications) running on a computing device, for a specific application (or set of applications) running on the connected set of computing devices, for all applications running on a computing device, for all applications running on the connected set of computing devices, and/or at some other level of granularity related to applications running on the computing device or connected set of computing devices.

The report may include, for each application, information about a list of camera access types requested. The report may also include some or all of the following for each application: an indicator of an amount of camera access requests of each type requested; an indicator of responses to each camera access request type (e.g., a ratio of permitted to not permitted requests of each type, a ratio of camera access request types that were always permitted to camera access requests types where at least one request was not permitted, etc.); information about remediation(s) performed for camera access request types that were not permitted, a total number of camera access requests; and/or other information about the camera access requests of the application. In some examples, the report may also include information comparing applications running on the computing device and/or connected set of computing devices based on the camera access requests of the applications and whether those camera access requests were permitted or not.

The camera access permission engine 122 may determine, based on a set of camera access types associated with the application, whether the requested type of camera access is permitted. The camera access permission engine 122 may access the set of camera access types associated with the application from a non-transitory storage medium (e.g., storage medium 120). In some examples, the camera access permission engine 122 may determine the set of camera access types associated with the application based on a description associated with the application. For example, the camera access permission engine 122 may parse the text of the description of the application to determine a set of keywords that may match information related to a camera access type stored in the storage medium 120. In this example, the storage medium 120 may store, for each camera access type, an identifier of the camera access type, a set of keywords associated with the camera access type, a function call or sequence of function calls associated with the camera access type, and/or other information related to the camera access type. The camera access permission engine 122 may also add a new camera access type to the storage medium 120 based on the parsed text of the description of the application responsive to determining that a camera access occurs in the application that does not match an existing camera access type of the stored set of camera access types.

In some examples, the camera access permission engine 122 may determine whether the requested type of camera access is permitted based on whether the requested type of camera access is included in the set of camera access types associated with the application. In these examples, responsive to the requested type of camera access being including in the set of camera access types, the camera access permission engine 122 may determine that the requested type of camera access is permitted. Responsive to the requested type of camera access not being included in the set of camera access types, the camera access permission engine 122 may determine that the requested type of camera access is not permitted.

In some examples, the camera access permission engine 122 may apply one or multiple policies related to an application, a set of applications, the computing device, the connected set of computing devices, a geolocation of the computing device, a time of day at which the application is running, any combination thereof, and/or other factors. The policies may be used to enforce security in various environments in which unpermitted camera accesses may need detection and remediation (e.g., a bring your own device environment, a secure data storage environment, a workplace, a school, a government facility, an area with minors, etc.).

In these examples, the camera access permission engine 122 may determine whether the requested camera access policy is permitted based on the applied policy/policies. For example, a policy may determine whether a camera access request type is permitted based on the request type being included in the set of camera access types. In another example, a policy may determine whether a camera access request type is permitted based on determining that a number of camera accesses of the requested type of camera access has exceeded a first predetermined threshold. In yet another example, a policy may determine whether a camera access request type is permitted based on determining that a number of distinct camera access types requested by the application and not included in the set of camera access types associated with the application has exceeded a second predetermined threshold. The policies described herein are examples and are not limiting; other policies may be used by the camera access permission engine 122.

In some examples, the policies may be stored in the storage medium 120. In these examples, the camera access permission engine 122 may determine which, if any, policies are applicable to the application and/or the specific camera access request, and may apply the applicable policies (if any) in determining whether the requested camera access type is permitted. Responsive to no policies being applicable, the camera access permission engine 122 may determine whether the requested camera access type is permitted by using a default policy. In some examples, the default policy may determine whether a camera access request type is permitted based on the request type being included in the set of camera access types Remediation engine 123 may remediate an unpermitted camera access request responsive to the camera access permission engine 122 determining that the request is not permitted. In some examples, remediation may comprise, for example, causing display, by the computing device, of an alert on the computing device, where the alert comprises information about an improper access of the camera by the application. In other examples, remediation may comprise preventing the application from accessing the camera responsive to determining that the requested type of camera access is not permitted or preventing the computing device from accessing a local area network to which the computing device had been connected responsive to determining that the requested type of camera access is not permitted. In yet other examples, remediation may comprise sending a notification to an administrator of the computing device and/or application, where the notification includes information indicating that the unpermitted camera access was requested and includes information about the unpermitted requested camera access. Remediation may also comprise shutting down the computing device, requiring entry of confidential information (e.g., a password, passcode, answers to predetermined questions, and/or other secret information from a user of the computing device) to continue running the application, requiring entry of confidential information to continue accessing the computing device, and/or other types of remediation. In some examples, the remediation engine 123 may perform multiple types of remediation.

In some examples, the remediation engine 123 may determine a remediation (or multiple remediations) based on a remediation (or set of remediations) associated with the camera access type in the storage medium 120. In some examples, the remediation engine 123 may determine a remediation to perform based on the policy or set of policies applied by the camera access permission engine 122. For example, the storage medium 120 may store, for each policy or set of policies, information about a corresponding remediation to perform responsive to determining that the requested camera access type is not permitted. The remediation engine 123 may perform the corresponding remediation based on the policy or set of policies applied by the camera access permission engine 122.

In performing their respective functions, engines 121-123 may access data storage 120 and/or other suitable database(s). Data storage 120 may represent any memory accessible to camera access breach detection system 100 that can be used to store and retrieve data. Data storage 120 and/or other databases communicably coupled to camera access breach detection system 100 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Camera access breach detection system 100 may access data storage 120 locally or remotely via a network.

Data storage 120 may include a database to organize and store data. The database may reside in a single or multiple physical device(s) and in a single or multiple physical location(s). The database may store a plurality of types of data and/or files and associated data or file description, administrative information, or any other data. In some examples, data storage 120 may also include storage for the applications running on system 100.

Figure 2:
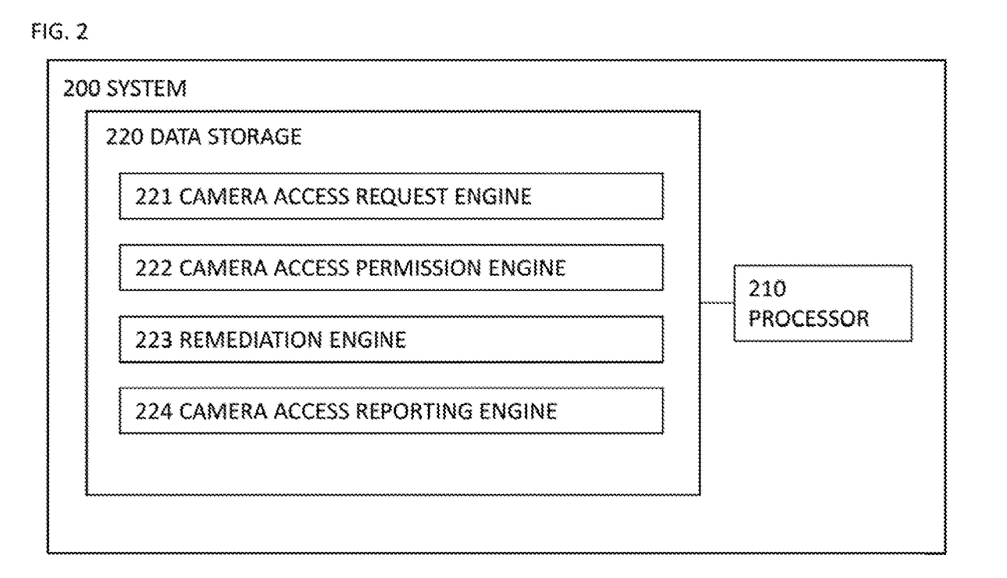
FIG. 2 is a block diagram depicting an example machine-readable storage medium comprising instructions executable by a processor for camera access breach detection.

FIG. 2 is a block diagram depicting an example camera access breach detection system 200. Camera access breach detection system 210 may comprise a processor 210, camera access request engine 221, a camera access permission engine 222, a remediation engine 223, and a camera access reporting engine 224. Engines 221-224 represent engines 121-123, respectively.

Figure 3:
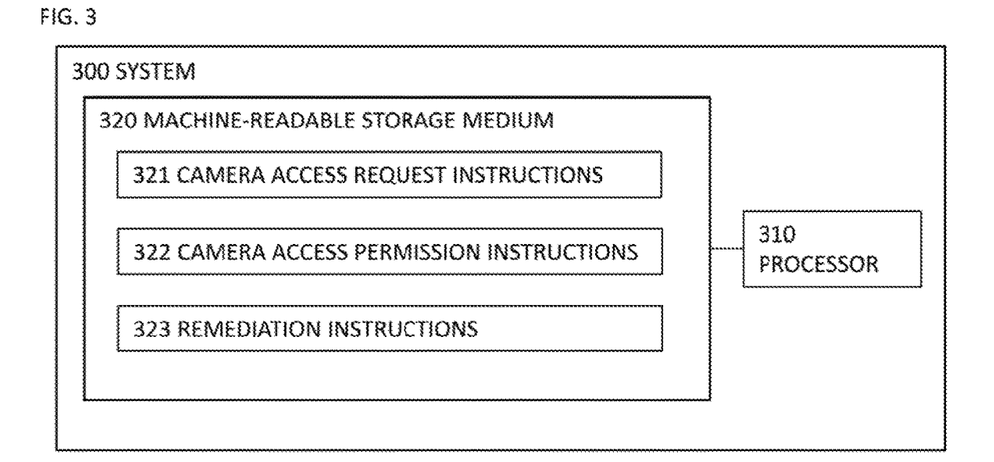
FIG. 3 is a block diagram depicting an example machine-readable storage medium comprising instructions executable by a processor for camera access breach detection.

FIG. 3 is a block diagram depicting an example machine-readable storage medium 310 comprising instructions executable by a processor for detecting camera access breaches.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements camera access breach detection system 100 of FIG. 1.

In FIG. 3, the executable program instructions in machine-readable storage medium 310 are depicted as camera access request instructions 321, camera access permission instructions 322, and remediation instructions 323. Instructions 321-323 represent program instructions that, when executed, cause processor 311 to implement engines 121-123, respectively.

Figure 4:
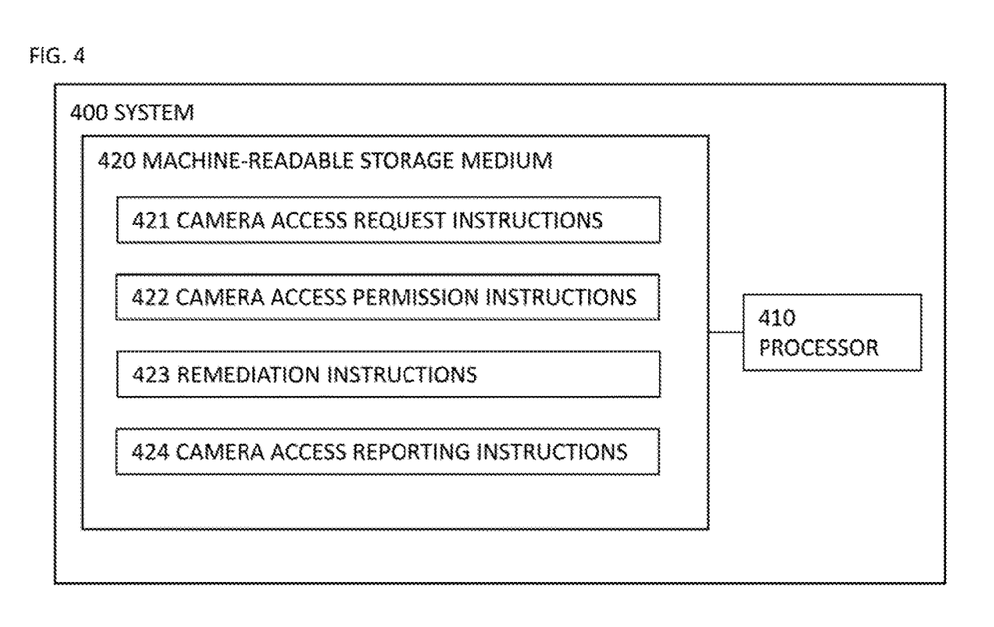
FIG. 4 is a block diagram depicting an example machine-readable storage medium comprising instructions executable by a processor for camera access breach detection.

FIG. 4 is a block diagram depicting an example machine-readable storage medium 420 comprising instructions executable by a processor for detecting camera access breaches.

In the foregoing discussion, engines 221-225 were described as combinations of hardware and programming. Engines 221-225 may be implemented in a number of fashions. Referring to FIG. 4, the programming may be processor executable instructions 421-424 stored on a machine-readable storage medium 420 and the hardware may include a processor 410 for executing those instructions. Thus, machine-readable storage medium 420 can be said to store program instructions or code that when executed by processor 410 implements camera access breach detection system 200 of FIG. 2.

In FIG. 4, the executable program instructions in machine-readable storage medium 410 are depicted as camera access request instructions 421, camera access permission instructions 422, remediation instructions 423, and camera access reporting instructions 424. Instructions 421-424 represent program instructions that, when executed, cause processor 410 to implement engines 221-224, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement camera access breach detection system 100. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321-323, and/or other instructions. As an alternative or in addition to retrieving and executing instructions, processor 310 may include at least one electronic circuit comprising a number of electronic components for performing the functionality of at least one of instructions 321-323, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 421-424, and/or other instructions. As an alternative or in addition to retrieving and executing instructions, processor 410 may include at least one electronic circuit comprising a number of electronic components for performing the functionality of at least one of instructions 421-424, and/or other instructions.

FIG. 5 is a flow diagram depicting an example method 500 for detecting camera access breaches. The various processing blocks and/or data flows depicted in FIG. 5 (and in the other drawing figures such as FIGS. 6 & 7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 5 as illustrated (and described in greater detail below) is meant be an example and, as such, should not be viewed as limiting. The method of FIG. 5 may be implemented in the form of executable instructions stored on a machine-readable storage medium, such as storage medium 420, and/or in the form of electronic circuitry.

In an operation 500, a determination may be made that a type of camera access of a camera on a computing device is requested by an application running on the computing device. For example, the system 100 (and/or the camera access request engine 121, the camera access request instructions 321, or other resource of the system 100) may determine that a type of camera access of a camera on a computing device is requested by an application running on the computing device. The system 100 may determine that the type of camera access is requested in a manner similar or the same as that described above in relation to the execution of the camera access request engine 121, the camera access request instructions 321, and/or other resource of the system 100.

In an operation 510, a determination may be made, based on a set of camera access types associated with the application, whether the requested type of camera access is permitted. For example, the system 100 (and/or the camera access permission engine 122, the camera access permission instructions 322, or other resource of the system 100) may determine whether the requested type of camera access is permitted. The system 100 may determine whether the requested type of camera access is permitted in a manner similar or the same as that described above in relation to the execution of the camera access permission engine 122, the camera access permission instructions 322, and/or other resource of the system 100.

In some examples, determining whether the requested camera access type is permitted may be done in several manners. FIG. 6 is a flow diagram depicting an example method for detecting camera access breaches and, in particular, determining whether a requested camera access type is permitted. In particular, FIG. 6 shows several examples of how to determine whether the permit the requested camera access type (as discussed above with respect to operation 510). The method of FIG. 6 as illustrated (and described in greater detail below) is meant to be an example and, as such, should not be viewed as limiting. The method of FIG. 6 may be implemented in the form of executable instructions stored on a machine-readable storage medium, such as storage medium 320, and/or in the form of electronic circuitry. Further, each example in FIG. 6 may be performed alone, in conjunction with each other, in any combination thereof, or with any other examples provided herein.

In an operation 511, a determination may be made as to whether the requested camera access type is included in the set of camera access types associated with the application. For example, the system 100 (and/or the camera access permission engine 122, the camera access permission instructions 322, or other resource of the system 100) may determine whether the requested camera access type is included in the set of camera access types. The system 100 may determine whether the requested camera access type is included in the set of camera access types in a manner similar or the same as that described above in relation to the execution of the camera access permission engine 122, the camera access permission instructions 322, and/or other resource of the system 100.

In an operation 512, a determination may be made as to whether a number of camera accesses of the requested type of camera access has exceeded a first predetermined threshold. For example, the system 100 (and/or the camera access permission engine 122, the camera access permission instructions 322, or other resource of the system 100) may determine whether the number of camera accesses of the requested type of camera access has exceeded a first predetermined threshold. The system 100 may determine whether the number of camera accesses of the requested type of camera access has exceeded a first predetermined threshold in a manner similar or the same as that described above in relation to the execution of the camera access permission engine 122, the camera access permission instructions 322, and/or other resource of the system 100.

In an operation 513, a determination may be made as to whether a number of distinct camera access types requested by the application and not included in the set of camera access types associated with the application has exceeded a second predetermined threshold. For example, the system 100 (and/or the camera access permission engine 122, the camera access permission instructions 322, or other resource of the system 100) may determine whether a number of distinct camera access types requested by the application and not included in the set of camera access types associated with the application has exceeded a second predetermined threshold. The system 100 may determine whether a number of distinct camera access types requested by the application and not included in the set of camera access types associated with the application has exceeded a second predetermined threshold in a manner similar or the same as that described above in relation to the execution of the camera access permission engine 122, the camera access permission instructions 322, and/or other resource of the system 100.

Returning to FIG. 5, in an operation 520, responsive to determining that the requested type of camera access is not permitted, the unpermitted camera access request may be remediated by causing an alert to be displayed on the computing device, where the alert comprises information about an improper access of the camera by the application. For example, the system 100 (and/or the remediation engine 123, the remediation instructions 323, or other resource of the system 100) may remediate the unpermitted camera access request. The system 100 may remediate the unpermitted camera access request in a manner similar or the same as that described above in relation to the execution of the remediation engine 123, the remediation instructions 323, and/or other resource of the system 100.

The foregoing disclosure describes a number of example implementations for detecting camera access breaches. The disclosed examples may include systems, devices, computer-readable storage media, and methods for detecting camera access breaches. For purposes of explanation, certain examples are described with reference to the components illustrated in FIGS. 1-6. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for detecting and remediating camera access breaches, the method comprising:
   detecting, by a computing device comprising a physical processor that implements machine readable instructions, one or more function calls by an application running on the computing device;
   determining, by the computing device, based on the one or more function calls that a type of camera access of a camera on a computing device is requested by an application running on the computing device, wherein the type of camera access comprises a photo, a video, a facial recognition, a bar code scanning, or object detection, wherein the application has been provided access to the camera, and wherein the computing device includes a connection to a local area network;
   determining, by the computing device based on the application running on the computing device, a set of camera access types associated with the application, and the type of camera access that is being requested by the application, whether the requested type of camera access is permitted; and
   responsive to determining that the requested type of camera access is not permitted, remediating the unpermitted camera access request, wherein remediating the unpermitted camera access includes preventing the computing device from accessing the local area network.

2. The method of claim 1, further comprising:
   determining the set of camera access types associated with the application based on a description associated with the application.

3. The method of claim 1, further comprising:
   responsive to determining that set of camera access types associated with the application includes the camera access type, permitting the camera access request.

4. The method of claim 1, wherein remediating the unpermitted camera access request further comprises:
   causing display, by the computing device, of an alert on the computing device, where the alert includes information about an improper access of the camera by the application.

5. The method of claim 1, wherein determining that the requested type of camera access is not permitted comprises:
   determining that a number of camera accesses of the requested type of camera access has exceeded a first predetermined threshold or determining that a number of distinct camera access types requested by the application and not included in the set of camera access types associated with the application has exceeded a second predetermined threshold.

6. The method of claim 1, further comprising:
   logging information about each camera access request by the application, the information including the type of the camera access requested, a geolocation of the computing device when the request was received, and an indication of whether the request was permitted.

7. The method of claim 6, further comprising:
   providing a report of the camera accesses requested by each application running on the computing device, where the report includes, for each application, a list of camera access types requested and a corresponding indicator of an amount of camera access requests of each type of camera access type requested.

8. The method of claim 1, wherein the computing device is an IoT (Internet of Things) device.

9. The method of claim 1, wherein detecting the one or more function calls includes using dynamic binary instrumentation techniques to detect function the one or more functions calls in real time.

10. A non-transitory machine-readable storage medium comprising instructions executable by a physical processor of a computing device for detecting camera access breaches, the machine-readable storage medium comprising instructions to:
   detect one or more function calls by an application running on a computing device;
   determine based on the one or more function calls, for a camera access request to access a camera of the computing device, a camera access type of the camera access request, wherein the type of camera access comprises a photo, a video, a facial recognition, a bar code scanning, or object detection, wherein the application has been provided access to the camera, and wherein the computing device includes a connection to a local area network;
   determine, based on the application running on the computing device, a set of camera access types associated with an application that requested the camera access request, and the type of camera access that is being requested by the application, whether the requested camera access type is permitted;
   permit the camera access request responsive to determining that the requested camera access type is permitted; and remediate the unpermitted camera access request responsive to determining that the requested camera access request type is not permitted, wherein remediating the unpermitted camera access includes preventing the computing device from accessing the local area network.

11. The non-transitory machine-readable storage medium of claim 10, wherein the instructions further comprise instructions to:
determine the set of camera access types associated with the application based on a description associated with the application.

12. The non-transitory machine-readable storage medium of claim 10, wherein the instructions to remediate the unpermitted camera access request further comprise instructions to:
cause display, by the computing device, of an alert on the computing device, where the alert includes information about an improper access of the camera by the application.

13. The non-transitory machine-readable storage medium of claim 10, wherein the instructions to determine that the requested type of camera access is not permitted comprise instructions to:
determine that a number of camera accesses of the requested type of camera access has exceeded a first predetermined threshold; or
determine that a number of distinct camera access types requested by the application and not included in the set of camera access types associated with the application has exceeded a second predetermined threshold.

14. The non-transitory machine-readable storage medium of claim 10, wherein the instructions further comprise instruction to:
log information about each camera access request by the application, the information including the type of the camera access requested, a geolocation of the computing device when the request was received, and an indication of whether the request was permitted; and
provide a report of the camera accesses requested by each application running on the computing device, where the report includes, for each application, a list of camera access types requested and a corresponding indicator of an amount of camera access requests of each type of camera access type requested.

15. A system for detecting and remediating camera access breaches, the system comprising:
a first physical processor that implements machine readable instructions that cause the system to:
detect one or more function calls by an application running on a computing device:
determine based on the one or more function calls that a type of camera access of a camera on the computing device is requested by the application running on the computing device, wherein the application has been provided access to the camera, wherein the computing device is connected to an enterprise local area network, and wherein the type of camera access comprises a photo, a video, a facial recognition, a bar code scanning, or object detection;
determine, based on the application running on the computing device, a set of camera access types associated with the application, and the type of camera access requested by the application, whether the requested type of camera access is permitted; and
responsive to determining that the requested type of camera access is not permitted, remediate the unpermitted camera access request, wherein remediating includes preventing access of the computing device to the local area network.

16. The system of claim 15, wherein the first physical processor implements machine readable instructions to cause the system to:
permit the camera access request responsive to determining that set of camera access types associated with the application includes the camera access type.

17. The system of claim 15, wherein the first physical processor implements machine readable instructions to cause the system to:
determine the set of camera access types associated with the application based on a description associated with the application.

18. The system of claim 15, wherein the first physical processor implements machine readable instructions to cause the system to determine that the requested type of camera access is not permitted by:
determining that a number of camera accesses of the requested type of camera access has exceeded a first predetermined threshold; or
determining that a number of distinct camera access types requested by the application and not included in the set of camera access types associated with the application has exceeded a second predetermined threshold.

19. The system of claim 15, wherein the first physical processor implements machine readable instructions to cause the system to further remediate the unpermitted camera access request by:
causing display of an alert, where the alert comprises information about an improper access of the camera by the application.

20. The system of claim 15, wherein the first physical processor implements machine readable instructions to cause the system to:
log information about each camera access request by the application, the information including the type of the camera access requested, a geolocation of the computing device when the request was received, and an indication of whether the request was permitted; and
provide a report of the camera accesses requested by each application running on the computing device, where the report includes, for each application, a list of camera access types requested and a corresponding indicator of an amount of camera access requests of each type of camera access type requested.

* * * * *